Feb. 23, 1932.   L. F. CLAWSON, JR   1,846,088
AIRCRAFT
Filed Aug. 26, 1929    2 Sheets-Sheet 1
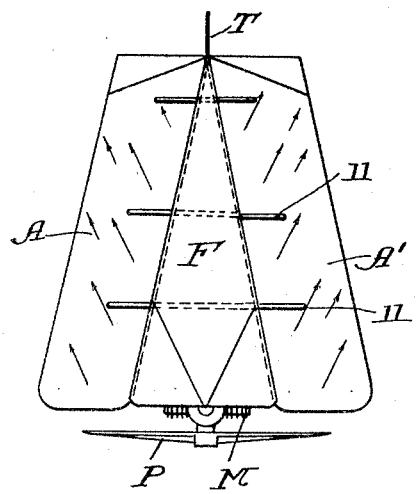
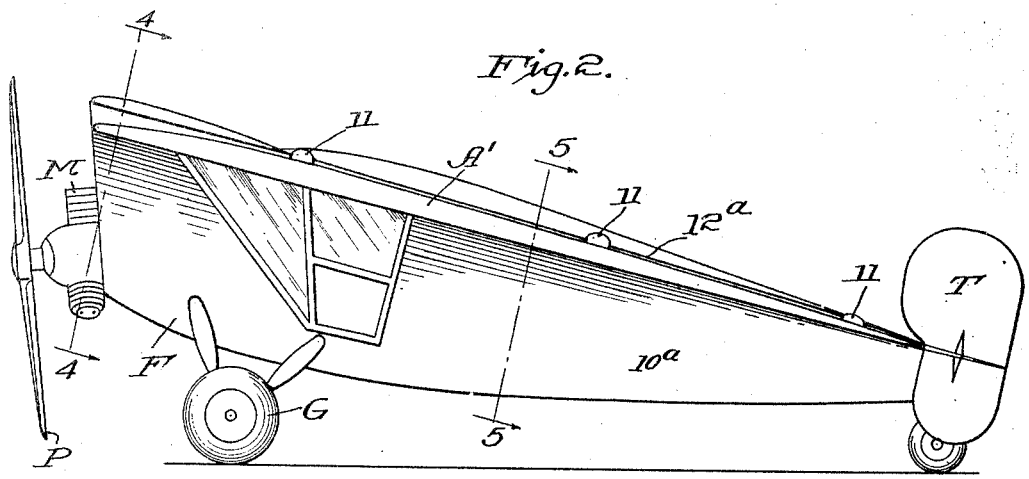
INVENTOR
Lewis F. Clawson Jr.
BY
ATTORNEY

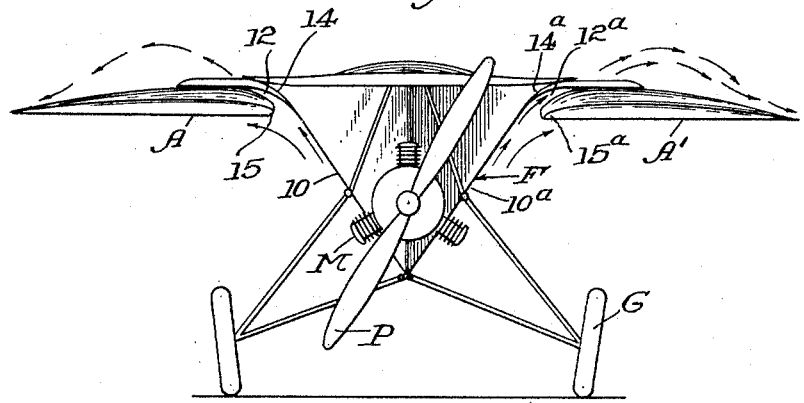
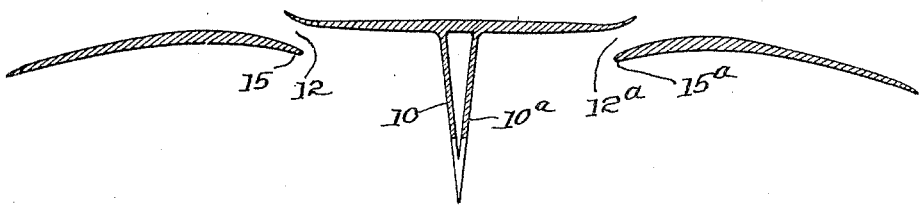
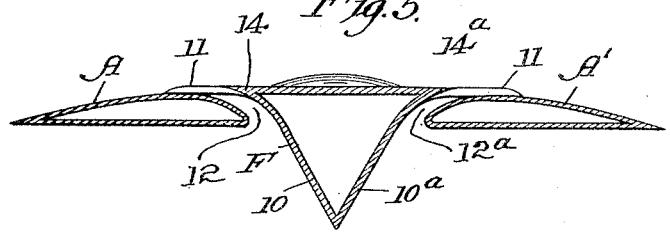

Patented Feb. 23, 1932

1,846,088

UNITED STATES PATENT OFFICE

LEWIS F. CLAWSON, JR., OF LA MESA, CALIFORNIA

AIRCRAFT

Application filed August 26, 1929. Serial No. 388,586.

My invention relates generally to aircraft and more particularly to aircraft of the heavier-than-air type, and it is a purpose of my invention to provide a heavier-than-air craft embodying means by which the effective lift of the craft's aerofoils is caused to be increased to such extent and in such manner as to prevent stalling of the craft when climbing or descending at a steep angle and at slow forward speeds, so that the craft is rendered capable of climbing rapidly in safety and descending slowly at slow forward speeds to land within restricted areas, all in addition to the desirable qualities of maximum high speed and increased lift in forward horizontal flight.

It is a further purpose of my invention to provide an aircraft embodying means operable automatically when the craft assumes a climbing or stalling angle in flight, to increase the effectiveness of the air stream in creating a partial vacuum upon the upper surfaces of the aerofoils and hence increase the lift of the latter to such extent that notwithstanding slow forward speeds, the craft will be prevented from going into a stall with possible disaster to the craft and its occupants, and is enabled to climb rapidly and land slowly on restricted areas with perfect safety.

It is another purpose of my invention to provide an aircraft which in addition to the above recited advantages, is characterized by its compactness, small wing spread, maximum strength and rigidity, and inherent stability.

I will describe only one form of aircraft embodying my invention and will then point out the novel features thereof in claims.

In the accompanying drawings,

Fig. 1 is a view showing in plan one form of heavier-than-air craft embodying my invention.

Fig. 2 is a view of the aircraft in side elevation.

Fig. 3 is a view of the aircraft in front elevation, and

Figs. 4 and 5 are transverse vertical sectional views taken respectively on the lines 4—4 and 5—5 of Fig. 2.

Referring specifically to the drawings in which similar reference characters designate similar parts in each of the several views, my invention in its present embodiment comprises a fuselage F having mounted at the forward end thereof a conventional power plant M and a tractor propeller P. The fuselage is also provided with a suitable landing gear G and tail assembly T, which with the power plant, its controls, as well as the flying controls (not shown) form no part of my present invention so that further description thereof will be dispensed with.

The fuselage is preferably V shaped in cross section and is tapered inwardly in plan forwardly and rearwardly from a point adjacent its forward end as shown in Fig. 1. The side walls 10 and 10$^a$ of the fuselage thus flare or diverge upwardly and outwardly from each other; and from the opposite sides of the fuselage extend aerofoils A and A' supported from the fuselage by suitable streamlined spars 11 extending transversely of the fuselage at intervals along its length and overlying and secured to the aerofoils. The aerofoils are supported in parallelism with the side walls 10 and 10$^a$ respectively and in spaced relation thereto to provide passages in the form of slots 12 and 12$^a$ through which streams of air are adapted to flow and traverse the upper lifting surfaces of the aerofoils in a manner to be hereinafter described.

The aerofoils are co-extensive in length with the fuselage, and the side walls 10 and 10$^a$ of the fuselage throughout its rearwardly and inwardly tapering portion in plan, curve upwardly and outwardly from each other as indicated at 14 and 14$^a$ so as to overlie the upper surfaces of the respective aerofoils A and A', and thus direct upwardly traveling air over the upper lifting surfaces of the aerofoils.

The areofoils are cambered in directions transversely of the fuselage as shown in Figs. 2 and 3 respectively, with the leading edges of the transverse camber confronting the sides of the fuselage at the slots 12 and 12$^a$ as indicated respectively at 15 and 15$^a$ in Fig. 3.

The operation of the aircraft is as follows:

Let it be assumed that the craft is in forward horizontal flight, and by reference to Fig. 1 it will be clear that the position of the axis of the propeller P at an angle with respect to the aerofoils A and A' is such that the propeller race or slip stream will be directed rearwardly and towards the undersides of the aerofoils, and that as the craft is drawn forwardly through the air the cambering of the aerofoils transversely of the fuselage F will produce a lifting effect from the air stream to sustain the craft in flight. As the side walls 10 and 10ª of the fuselage flare upwardly and outwardly from each other and curve over the aerofoils it will be clear that a portion of the propeller slip stream will be directed upwardly and rearwardly through the slots 12 and 12ª and thence over the upper lifting surfaces of the aerofoils in a rearward and outward direction as indicated by the arrows in Fig. 1, thus increasing the partial vacuum produced by the upper lifting surfaces of the aerofoils and hence increasing the effective lift of the aerofoils so as to enable the craft to rise rapidly when taking off.

Should the pilot now manipulate the controls to cause the craft to climb or gain altitude by assuming a forwardly and upwardly inclined position and hence increase the angle of incidence of the aerofoils with respect to the air stream, the flow of the air stream through the slots 12 and 12ª and over the upper lifting surfaces will be further increased, so that although the speed of the craft will diminish as a result of the greater resistance offered to forward movement of the craft by the increased angle of incidence of the areofoils, the effective lift of the aerofoils will be increased so that in climbing at a relatively steep angle and at a slow forward speed, or at an angle at which a plane not equipped with my invention would stall and become unmanageable, the necessary lift to maintain perfect control will be provided. The air flow will also be increased in descending with the plane in a climbing or stalling position, to the end that sufficient lift will be provided to permit a slow descent and a landing at slow forward speeds within a restricted area.

It will thus be clear that stalling of the craft will be positively prevented, as the greater the angle from the horizontal assumed by the craft, the more will the effective lift of the aerofoils be increased. Furthermore with operation of the power plant P discontinued, the lift of the areofoils will be maintained due to the upward flow of the air stream through the slots 12 and 12ª and over the upper lifting surfaces of the areofoils as a descent is made with the tail of the craft depressed and its nose above the horizon.

Although I have herein shown and described only one form of aircraft embodying my invention, it is to be understood that various changes and modifications may be made therein without departing from the spirit of the invention and the spirit and scope of the appended claims.

I claim:

1. An aircraft having a fuselage and aerofoils projecting from opposite sides of the fuselage and spaced from the latter to provide intervening passages through which the air stream is adapted to flow when the craft is in flght, the side walls of the fuselage flaring upwardly and outwardly and being so positioned with respect to the aerofoils as to direct the air stream through said passages and over the upper surfaces of the aerofoils and thereby increase the effective lift of the latter.

2. An aircraft having a fuselage and aerofoils projecting from opposite sides of the fuselage and spaced from the latter to provide intervening passages through which the air stream is adapted to flow when the craft is in flight, the side walls of the fuselage flaring upwardly and outwardly and curving outwardly over the upper surfaces of the aerofoils so as to direct the air stream through said passages and over the upper surfaces of the aerofoils and thereby increase the effective lift of the latter.

3. An aircraft having a fuselage and aerofoils cambered in directions transversely of the fuselage with the transverse leading edges of the aerofoil confronting the side walls of the fuselage and spaced therefrom to provide intervening passages through which the air stream is adapted to flow when the aircraft is in flight, the side walls of the fuselage flaring upwardly and outwardly and extending over the upper surfaces of the aerofoils so as to direct the air stream over the aerofoils when the craft assumes a stalling angle and thereby increase the effective lift of the aerofoils to such extent as to enable the craft to climb at a steep angle and to descend slowly without stalling.

4. An aircraft having a fuselage and aerofoils paralleling the side walls of the fuselage and spaced therefrom to provide intervening slots through which the air stream is adapted to flow when the craft is in flight, the aerofoils being cambered in directions transversely of the fuselage with their transverse leading edges confronting the side walls of the fuselage, and the fuselage being substantially V shaped in cross section and curving outwardly over the upper surfaces of the aerofoils so as to direct the air stream through said slots and over the upper surfaces of the aerofoils when the craft assumes a stalling angle and thereby increase the effective lift of the aerofoils to such extent as to enable the craft to climb at a steep angle and to descend slowly without stalling.

5. An aircraft having a power driven tractor propeller, a fuselage and aerofoils extending from oposite sides of the fuselage and spaced therefrom to provide intervening passages through which a stream of air is adapted to flow, and means for so directing the slip stream from the propeller through said passages and rearwardly over the aerofoils as to increase the effective lift of the latter.

6. An aircraft having a power driven tractor propeller, a fuselage and aerofoils extending from opposite sides of the fuselage and spaced therefrom to provide intervening passages through which a stream of air is adapted to flow, the side walls of the fuselage flaring upwardly and outwardly to direct the slip stream from the propeller through said passages and then outwardly and rearwardly over the aerofoils, to increase the effective lift of the latter.

7. An aircraft having aerofoils, and means defining surfaces against which the air stream is adapted to impinge when the craft is in flight, the surfaces flaring upwardly and outwardly and being so positioned with respect to the aerofoils as to direct the air stream across the latter and thereby increase their effective lift.

LEWIS F. CLAWSON, Jr.